United States Patent [19]

Eschner

[11] Patent Number: 5,346,868
[45] Date of Patent: Sep. 13, 1994

[54] INORGANIC FIBER

[75] Inventor: Axel Eschner, Wiesbaden, Fed. Rep. of Germany

[73] Assignee: Didier-Werke AG, Wiesbaden, Fed. Rep. of Germany

[21] Appl. No.: 73,067

[22] Filed: Jun. 8, 1993

[30] Foreign Application Priority Data

Aug. 26, 1992 [DE] Fed. Rep. of Germany ....... 4228353

[51] Int. Cl.$^5$ ............................................. C04B 35/02
[52] U.S. Cl. ........................................ 501/95; 501/10; 501/41; 501/36; 106/711
[58] Field of Search ............... 501/95, 10, 41, 36; 106/692, 711

[56] References Cited

U.S. PATENT DOCUMENTS

| | | | |
|---|---|---|---|
| 2,829,063 | 4/1958 | Schwartzwalder et al. | 106/692 |
| 3,150,992 | 9/1964 | Crowley | 106/692 |
| 4,162,923 | 7/1979 | Schmitt et al. | 106/692 |
| 5,032,552 | 7/1991 | Nonami et al. | 501/95 |
| 5,045,506 | 9/1991 | Dube et al. | 501/36 |
| 5,137,852 | 8/1992 | Morgan et al. | 501/95 |

FOREIGN PATENT DOCUMENTS

0459897A1  12/1991  European Pat. Off. .

*Primary Examiner*—Mark L. Bell
*Assistant Examiner*—Deborah Jones
*Attorney, Agent, or Firm*—Wenderoth, Lind & Ponack

[57] ABSTRACT

The invention relates to inorganic fibers, and a process for their production. The inorganic fibers lose their fiber form factor after a short contact period with water or a physiological body fluid, so that danger to health is not expected from such fibers remaining for a prolonged period of time in or on human tissue. The fiber of the invention is characterized by the fact that at least 90% of it comprises 20–50% by weight of CaO and 50–80% by weight of $Al_2O_3$. The rest comprises a maximum of 10% by weight of typical impurity oxides.

13 Claims, 1 Drawing Sheet

INORGANIC FIBER

BACKGROUND OF THE INVENTION

The present invention relates to inorganic fibers.

State of the art ceramic fibers from the system $Al_2O_3$-$SiO_2$ with 40–75% by weight of $Al_2O_3$ and no more than 2% by weight of alkaline- and alkaline earth oxide are X-ray amorphous, and prior art fibers with 80–95% by weight of $Al_2O_3$, the rest being $SiO_2$, are crystalline. Such fibers are used for thermal insulation at raised temperatures as mats and fibrous moldings, and for the manufacture of reinforced ceramic or metallic moldings.

The prior art ceramic fibers have a high resistance to water, i.e. they do not dissolve in water or in physiological solutions, or they dissolve only after a very long period of time. When heat is applied, the fibers crystallize out; or in the case of fibers that are already crystalline, such fibers show additional crystal growth. The form factor of the fiber, characterized by the length to diameter ratio, remains preserved in all cases. In addition, the X-ray amorphous fibers form, on account of their high $SiO_2$ content, upon the application of heat, cristobalite, which causes silicosis.

Furthermore, there exists the idea that ceramic fibers can be cancer-causing, for which their resistance to dissolving in water or in body fluids is regarded as an important reason. They remain preserved in the body as fine fibrous foreign bodies similar to asbestos fibers, and could lead to irritations. Values for the so-called "network dissolution rate" and the residence time of different fibers in liquid are known from "Keramik und Glas", Reports of the Professional Association of the Ceramic and Glass Industry, March 1992, No. 1, pages 30–41, in particular pages 38–40.

According to EP 0 459 897 A1, a modified fiber, namely fibers based substantially on $SiO_2$, $Al_2O_3$ and alkaline earth oxides, which is supposed to decompose upon contact with a physiological environment, is obtained through the addition of $P_2O_5$. The fibers have a significant $SiO_2$ content and can be added at about 700° C.

SUMMARY OF THE INVENTION

The object of the present invention is an inorganic fiber and its manufacture, which is as free of $SiO_2$ as possible, and whose thermal and mechanical properties do not differ significantly from the fibers of the $Al_2O_3$-$SiO_2$ system, but which rapidly decomposes in the presence of water or body fluids, e.g. on the skin or upon breathing into the lungs, and totally loses its fiber structure, so that it can not exercise any harmful effects on the grounds of its form factor as a fiber.

This object is achieved by an inorganic fiber based on CaO and $Al_2O_3$.

The invention also relates to a process for producing these inorganic fibers.

DESCRIPTION OF THE PREFERRED EMBODIMENTS

Figure 1:
FIG. 1 is a photograph taken with a scanning electron microscope, of the fibers of the present invention.

The inorganic fiber of the present invention, which solves the problem discussed above, is characterized by the fact that at least 90% by weight of the fiber comprises 20–50% by weight of CaO and 50–80% by weight of $Al_2O_3$. The rest of the fiber comprises a maximum of 10% by weight of typical polluting oxides.

These inorganic fibers, having a raised calcium oxide content, can not be called ceramic fibers according to CEN (European Committee on Standards) document CEN/TC 187/WG3/N27, Jan. 1992, since such ceramic fibers must contain less than 2% by weight of alkaline and alkaline earth oxides.

The composition of the fibers, 90% of which comprises 20–50% by weight of CaO and 50–80% by weight of $Al_2O_3$, is based in essence on the CaO-$Al_2O_3$ system. The composition of the fibers is chosen in such a manner that it corresponds to that of calcium-aluminate cements.

In the manufacture of the fibers according to the invention, the typical starting substances can be used as in the manufacture of calcium-aluminate cements. Furthermore, typical additives, which are to be added in small amounts, such as gypsum ($CaSO_4 \cdot 2H_2O$) or the anhydride ($CaSO_4$), can be added.

The process for producing the fibers thus comprises melting a mixture of alumina calcinated lime in amounts to produce the inorganic fiber of the present invention, and forming the resultant melt into fibers.

Typical oxidic impurities in calcium-aluminate cements are MgO, $TiO_2$, iron oxide and $SiO_2$, which can, therefore, also be present in the fibers of the invention. Their total amount should not exceed, however, a maximum of 10% by weight, based on the total composition of the fibers, and in particular a maximum of 5% by weight, based on the weight of the fiber. The $SiO_2$ content should not exceed 1.5% by weight, preferably 0.8% by weight, based on the weight of the fiber.

The fibers of the invention can be produced according to the known methods for manufacturing mineral fibers, e.g. by a blowing process or centrifugal process.

The fibers of the invention that are produced from the liquid melt of the starting substances, in particular by blowing, are largely X-ray amorphous; they hydrate and decompose upon contact with water, losing their fiber structure. Preferably, at least 60% by weight of the fiber is X-ray amorphous.

The fibers of the invention have the usual dimensions, preferably a diameter ranging from 1 to 5 $\mu m$ and an average diameter of 3 $\mu m$, and a length of >20 $\mu m$. Preferably the maximum diameter is 10 $\mu m$.

It has been demonstrated, surprisingly, that such fibers hydrate in water after just a few days and begin to lose their fiber structure.

The inorganic fiber according to the invention decomposes progressively in the presence of water or body fluid by means of hydration, and loses its fiber structure with increasing hydration, and is thus no longer harmful on the grounds of its form factor as a fiber after a relatively short time span of water contact. This is advantageous both in the received state and in processing or incorporation of fibers for moldings made thereof, and also when a fiber lining is torn down, in particular in industrial furnaces, and when dumping such tear-down material. If, for example, upon erupting, part of a furnace made of an inorganic fiber product according to the invention is sprayed with water, the fibers hydrate and after a few days they can be removed as a shapeless, fiber-free mass. This mass can be dumped and recycled as an eruption that is rich in alumina.

Even if the fibers are breathed in, they decompose within a maximum of a few days, so that there is no risk of silicosis.

Therefore, the inorganic fibers according to the invention, which lose their fiber structure upon contact with water, represent a less harmful product compared to the prior art ceramic fibers.

The inorganic fiber of the present invention can be used to produce fibrous structures, for example, a heat-insulating fiber mat, or fiber moldings. In addition, the inorganic fiber can be used to produce seals and joint fillers for ceramic moldings. Furthermore, the inorganic fiber can be used for reinforcing ceramic or metallic moldings.

The inorganic fiber, its manufacture and application are explained in detail by means of the following examples with reference to the photographs shown in the drawings.

EXAMPLE 1

A mixture comprising 50% by weight of alumina and 50% by weight of calcinated lime was compacted into pellets. The pellets were melted at 1650° C. in a furnace, and the melt was blown with compressed air.

In so doing, fibers having a diameter of up to 8 $\mu$m and an average fiber diameter of 3 $\mu$m were obtained. When stored in water, these fibers showed a beginning hydration after just 4 hours; and after 2 days the fibers had largely decomposed. Examination with a scanning electron microscope (REM) could no longer demonstrate any fibers on the dried sample of the fibers stored in water for 2 days.

FIG. 1 is a photograph taken with the scanning electron microscope, of fibers following their manufacture, the photograph being enlarged 2100×.

Figure 2:
FIG. 2 is a photograph, also taken with a scanning electron microscope, of the fibers of the present invention after they have been stored in water for 2 days.

FIG. 2 is a photograph taken with the scanning electron microscope, of fibers stored in water for 2 days, the photograph being enlarged 2000×.

It is clear from a comparison of these 2 photographs that the fibers had almost totally lost their fiber structure or their fiber form factor after storage in water for 2 days.

EXAMPLE 2

Fibers of another starting mixture with 63% by weight of alumina, 30% by weight of calcinated lime, 5% by weight of calcium sulfate and 2% by weight of impurity oxides ($Fe_2O_3$, MgO, $SiO_2$) lead to the same results as the fibers, described above, of the mixture with 50% by weight of alumina and 50% by weight of calcinated lime. In the manufacture of these fibers, as in Example 1, the starting mixture was melted at 1650° C. and blown into fibers.

EXAMPLE 3

Fibers according to Example 2 were suspended by a well-known method in water and shaped into fibrous bodies following addition of starch as a temporary binder according to straight vacuum forming. The shaped bodies obtained showed the same properties as the prior art fibrous shaped bodies, based on ceramic fibers of the $Al_2O_3$-$SiO_2$ system. The dimensions of the fibers were largely unchanged in the manufactured shaped bodies. A fibrous body pretreated by firing at 1,000° C. was water stored. After 2 days the fibrous body had decomposed into a shapeless mass, in which hardly any fibers could be detected any more.

So-called fiber blankets can be made from the fiber of the invention by needling in the well-known manner.

EXAMPLE 4

This example shows an advantageous application of the fibers of the invention for manufacturing so-called refractory light-weight moldings as so-called fiber structures.

Fibers, according to the invention, made from the mixture with 50% by weight of alumina and 50% by weight of calcinated lime, melted and blown at 1,650° C., were used to make fiber structures. A molding compound, which was compacted into moldings (boards) at a molding pressure of 1 $N/m^2$, was made from 70% by weight fibers and 30% by weight water. The moldings were stored at 25° C., 100% atmospheric humidity, for 24 hours, whereby the fibers were largely hydrated, and thus resulting in a hydraulic setting. In this manner a light-weight structural panel was obtained in which the fibers had largely decomposed, but that exhibited high porosity with simultaneously high mechanical strength and outstanding refractory properties. Upon subsequent firing at 1,000° C., the moldings proved to be dimensionally stable. Examination with the scanning electron microscope could still demonstrate only a few residual fibers.

Compositions made of inorganic fibers (diameter <10 $\mu$m; average fiber diameter 3 $\mu$m) according to the invention and water, molded into moldings, solidify after about 1 day. Following solidification and drying, the moldings exhibit excellent strength and high thermal insulation despite the fact that the fiber structure had been macroscopically lost.

I claim:

1. An inorganic fiber, at least 90% by weight of which comprises 20–50% by weight of CaO and 50–80% by weight of $Al_2O_3$, and up to 10% by weight of which comprises impurities, based on the weight of the fiber, with the proviso that the fiber contain up to 1.5% by weight of $SiO_2$.

2. The inorganic fiber as claimed in claim 1, at least 95% by weight of which comprises 20–50% by weight of CaO and 50–80% by weight of $Al_2O_3$.

3. The inorganic fiber as claimed in claim 1, wherein at least 60% by weight of the fiber is X-ray amorphous.

4. The inorganic fiber as claimed in claim 1, wherein the amount of $SiO_2$ is up to 0.8% by weight based on the weight of the fiber.

5. The inorganic fiber as claimed in claim 1, wherein the fiber has a diameter of 10 $\mu$m or less.

6. The inorganic fiber as claimed in claim 5, wherein the fiber has a diameter of 1–5 $\mu$m.

7. The inorganic fiber as claimed in claim 1, wherein the fiber has a length of greater than 20 $\mu$m.

8. A fibrous structure comprising the inorganic fiber of claim 1.

9. The fibrous structure as claimed in claim 8, wherein the structure is a heat insulating fiber mat.

10. A fiber molding which comprises the inorganic fiber of claim 1.

11. A seal for a ceramic molding, wherein the seal comprises the inorganic fiber of claim 1.

12. A joint filler for a ceramic molding, wherein the filler comprises the inorganic fiber of claim 1.

13. A ceramic or metallic molding reinforced with the inorganic fiber of claim 1.

* * * * *